(12) United States Patent
Chai et al.

(10) Patent No.: US 10,952,026 B2
(45) Date of Patent: *Mar. 16, 2021

(54) NEURAL NETWORK CLASSIFIER FOR DETECTION OF TRAVEL MODE ASSOCIATED WITH COMPUTING DEVICES

(71) Applicant: Mapbox, Inc., San Francisco, CA (US)

(72) Inventors: Lily Chai, San Francisco, CA (US); Ruggero Altair Tacchi, San Francisco, CA (US)

(73) Assignee: MAPBOX, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,431

(22) Filed: Oct. 30, 2019

(65) Prior Publication Data

US 2020/0068350 A1 Feb. 27, 2020

Related U.S. Application Data

(63) Continuation-in-part of application No. 15/724,875, filed on Oct. 4, 2017, now Pat. No. 10,496,881, which
(Continued)

(51) Int. Cl.
*G06F 17/18* (2006.01)
*H04W 4/02* (2018.01)
(Continued)

(52) U.S. Cl.
CPC ............ *H04W 4/027* (2013.01); *G06F 17/18* (2013.01); *G06N 3/08* (2013.01); *G06N 20/00* (2019.01); *H04W 4/029* (2018.02)

(58) Field of Classification Search
CPC ............ G06N 20/00; G06N 5/04; G06N 3/08; G06N 3/086; G06N 7/005; G06N 20/20;
(Continued)

(56) References Cited

U.S. PATENT DOCUMENTS 9,367,814 B1 6/2016 Lewis et al.
10,496,881 B2 * 12/2019 Chai .................. G01C 21/32
(Continued)

OTHER PUBLICATIONS

Wawrzyniak et al., Sequence detection of movement for accurate area based indoor positioning and tracking, 2015, IEEE, p. 1-4 (Year: 2015).*
(Continued)

*Primary Examiner* — Mcdieunel Marc
(74) *Attorney, Agent, or Firm* — Fenwick & West LLP (57) ABSTRACT

Digital data corresponding to a trace by a device is received. The digital data includes location data and time data obtained over a period of time and representing movement of the device. A set of derived values for the plurality of metrics is calculated from the sets of values corresponding to the metrics, and the set of derived values is input to a neural network classification model to determine whether the received digital data represents movement of a first type. In response to determining that the digital data represents movement of the first type, the received digital data corresponding to the trace is labelled with the first type of movement.

20 Claims, 5 Drawing Sheets

Related U.S. Application Data is a continuation-in-part of application No. 15/673,160, filed on Aug. 9, 2017, now Pat. No. 10,401,181.

(60) Provisional application No. 62/757,698, filed on Nov. 8, 2018.

(51) Int. Cl.
*H04W 4/029* (2018.01)
*G06N 20/00* (2019.01)
*G06N 3/08* (2006.01)

(58) Field of Classification Search
CPC .... G06N 3/0445; G06N 3/0454; G06N 3/088; G06N 5/003; G06N 5/022; G06F 16/2379; G06F 16/27; G06F 9/543; G06F 3/0482; G06F 3/017; G06F 3/011; G06F 3/04842; G06F 11/1469; G06F 11/3438; G06F 16/2365; G06F 16/9024; G06F 1/163; G06F 1/1694; G06F 2201/80; G06F 30/17; G06F 30/27; G06F 3/0481; G06F 3/04815; G06F 3/04883; G06F 3/167; G06F 9/5027; G06F 9/54; G16H 50/20; G16H 50/70; H04L 67/10; H04L 41/16; H04L 41/22; H04L 2012/40215; H04L 43/04; H04L 43/045; H04L 43/08; H04L 47/822; H04L 63/126; H04W 8/08; H04W 36/30; H04W 4/027; G07C 5/008; G07C 5/0808; G07C 5/006; G07C 5/02; G07C 5/0841; G07C 5/085; G07C 5/10; G06K 9/00832; G06K 9/00335; G06K 9/00791; G06K 9/00812; G06K 9/00845; G06K 9/6223; G06K 9/623; G06K 9/6268; G06K 9/6288; G06K 9/6289; G07F 17/3211; G10L 15/16; G10L 15/22; G10L 25/63; G10L 15/1822; G10L 19/008; G10L 2015/088; G10L 2015/223; G10L 2021/02166; G10L 21/003; G10L 21/013; G10L 21/0208; G10L 21/055; G10L 25/21; G10L 25/84; G10L 25/90; H04B 10/07955; H04B 10/116; H04B 15/005; H04B 17/318; H04B 17/309; G01R 31/007; G05B 19/042; G05B 2219/25252; G05B 2219/25425; H04Q 2209/40; H04Q 2209/823; H04R 1/326; H04R 29/005; H05B 47/175

See application file for complete search history.

(56) References Cited

U.S. PATENT DOCUMENTS

| | | |
|---|---|---|
| 2005/0165886 A1 | 7/2005 | Tuer et al. |
| 2006/0178140 A1 | 8/2006 | Smith et al. |
| 2014/0279739 A1 | 9/2014 | Elkington et al. |
| 2017/0039765 A1 | 2/2017 | Zhou et al. |
| 2019/0049255 A1* | 2/2019 | Chai ............... H04W 4/02 |
| 2019/0050624 A1 | 2/2019 | Chai et al. |
| 2020/0257301 A1* | 8/2020 | Weiser ............ G06N 3/02 |
| 2020/0294403 A1* | 9/2020 | Tong ............... G07C 5/10 |
| 2020/0294662 A1* | 9/2020 | Pfeiffer .......... H04L 67/10 |
| 2020/0294683 A1* | 9/2020 | Gutman .......... G16H 70/00 |
| 2020/0296053 A1* | 9/2020 | Garcia ............. H04L 47/822 |
| 2020/0296543 A1* | 9/2020 | Patel ............... G01K 13/002 |
| 2020/0296683 A1* | 9/2020 | Worsfold ......... H04W 4/80 |
| 2020/0296815 A1* | 9/2020 | Aggarwal ........ H05B 47/175 |

OTHER PUBLICATIONS

Elkan, C., et al., "Learning Classifiers from Only Positive and Unlabeled Data," Conference Paper, KDD'08, Aug. 24-27, 2008, Las Vegas, Nevada, USA, ACM, pp. 213-220, Can be retrieved at <URL:https://www.researchgate.net/publication/221654469_Learning_class-ifiers_from_only_positive_and_unlabeled_data>.

Ghasemzadeh et al., Structural Action Recognition in Body Sensor Networks: Distributed Classification Based on String Matching, *IEEE Transactions on Information Technology in Biomedicine*, vol. 14, Issue 2, Mar. 2010, pp. 425-435.

Ho et al., "GPS Data Based Urban Guidance," 2011 International Conference on Advances in Social Networks Analysis and Mining, Jul. 2011, p. 703-708.

Simoncini et al., "Vehicle Classification from Low Frequency GPS Data," 2016 IEEE 16th International Conference on Data Mining Workshops (ICDMW), Dec. 2016, pp. 1159-1166.

Sinha et al., "Kinect based people identification system using fusion of clustering and classification," 2014 International Conference on Computer Vision Theory and Applications (VISAPP), Oct. 2014, pp. 1-9.

United States Office Action, U.S. Appl. No. 15/673,160, dated Apr. 8, 2019, 37 pages.

Zhu et al., "Applying semi-supervised learning method for cellphone-based travel mode classification," 2015 IEEE First International Smart Cities Conference (ISC2), Oct. 2015, pp. 1-6.

United States Office Action, U.S. Appl. No. 15/724,875, dated May 3, 2019, 7 pages.

* cited by examiner

| 1 | 3 | 8 | 15 | 17 | 15 | 20 | 22 | 23 | 23 | 23 | 23 | 24 | 25 | 25 | 25 | 25 | 26 | 26 | 26 | 26 | 26 | 26 | 26 |
|---|---|---|----|----|----|----|----|----|----|----|----|----|----|----|----|----|----|----|----|----|----|----|----|
| 28 | 29 | 29 | 29 | 29 | 28 | 28 | 28 | 28 | 25 | 24 | 20 | 11 | 8 | 5 | 3 | 2 | 0 | 1 | 9 | 21 | 25 | 26 | 27 | 27 |
| 28 | 27 | 28 | 28 | 27 | 27 | 26 | 27 | 27 | 26 | 25 | 25 | 25 | 25 | 25 | 26 | 26 | 25 | 25 | 25 | 24 | 23 | 20 | 20 | 20 |
| 19 | 18 | 18 | 18 | 18 | 19 | 20 | 20 | 23 | 23 | 23 | 24 | 25 | 25 | 25 | 26 | 26 | 27 | 26 | 24 | 15 | 9 | 4 | 3 | 0 |

Observed Speed Data

310

3rd Quantile   1st Quantile                          2nd Quantile

| 0 | 0 | 1 | 1 | 2 | 3 | 3 | 3 | 4 | 5 | 8 | 8 | 9 | 9 | 11 | 15 | 15 | 15 | 17 | 18 | 18 | 18 | 18 | 19 | 19 |
|---|---|---|---|---|---|---|---|---|---|---|---|---|---|----|----|----|----|----|----|----|----|----|----|----|
| 20 | 20 | 20 | 20 | 20 | 20 | 20 | 21 | 22 | 23 | 23 | 23 | 23 | 23 | 23 | 23 | 23 | 24 | 24 | 24 | 24 | 24 | 25 | 25 | 25 |
| 25 | 25 | 25 | 25 | 25 | 25 | 25 | 25 | 25 | 25 | 25 | 25 | 25 | 25 | 26 | 26 | 26 | 26 | 26 | 26 | 26 | 26 | 26 | 26 | 26 |
| 26 | 26 | 26 | 26 | 26 | 27 | 27 | 27 | 27 | 27 | 27 | 27 | 27 | 28 | 28 | 28 | 28 | 28 | 28 | 28 | 28 | 29 | 29 | 29 | 29 |

Ordered Speeds

320

| 5 | 18 | 20 | 23 | 25 | 25 | 26 | 26 | 28 | 29 |
|---|----|----|----|----|----|----|----|----|----|

Derived Speed Vector

330

| 0.025 | 0.09 | 0.1 | 0.115 | 0.125 | 0.125 | 0.13 | 0.13 | 0.14 | 0.145 |
|-------|------|-----|-------|-------|-------|------|------|------|-------|

Normalized Derived Speed Vector

340

| 1 | 2 | 5 | 7 | 2 | -2 | 5 | 2 | 1 | 0 | 0 | 0 | 1 | 1 | 0 | 0 | 0 | 1 | 0 | 0 | 0 | 0 | 0 | 0 |
|---|---|---|---|---|----|---|---|---|---|---|---|---|---|---|---|---|---|---|---|---|---|---|---|
| 2 | 1 | 0 | 0 | 0 | -1 | 0 | 0 | 0 | -3 | -1 | -4 | -9 | -3 | -3 | -2 | -1 | -2 | 1 | 8 | 12 | 4 | 1 | 1 | 0 |
| 1 | -1 | 1 | 0 | -1 | 0 | -1 | 1 | 0 | -1 | -1 | 0 | 0 | 0 | 0 | 1 | 0 | -1 | 0 | 0 | -1 | -1 | -3 | 0 | 0 |
| -1 | -1 | 0 | 0 | 0 | 1 | 1 | 0 | 3 | 0 | 0 | 1 | 1 | 0 | 0 | 1 | 0 | 1 | -1 | -2 | -9 | -6 | -5 | -1 | -3 |

Observed Acceleration/Deceleration Data

350

| -9 | -9 | -6 | -5 | -4 | -3 | -3 | -3 | -3 | -3 | -2 | -2 | -2 | -2 | -1 | -1 | -1 | -1 | -1 | -1 | -1 | -1 | -1 | -1 | -1 |
|----|----|----|----|----|----|----|----|----|----|----|----|----|----|----|----|----|----|----|----|----|----|----|----|----|
| -1 | -1 | -1 | -1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 |
| 1 | 1 | 1 | 1 | 1 | 1 | 1 | 1 | 1 | 1 | 1 | 1 | 2 | 2 | 2 | 2 | 3 | 4 | 5 | 5 | 7 | 8 | 12 |

Ordered Accelerations/Decelerations

360

| 1 | 1 | 1 | 1 | 1 | 1 | 2 | 3 | 5 | 12 |
|---|---|---|---|---|---|---|---|---|----|

Derived Acceleration Vector

370

| 6 | 3 | 3 | 2 | 1 | 1 | 1 | 1 | 1 | 0 |
|---|---|---|---|---|---|---|---|---|---|

Derived Deceleration Vector

NEURAL NETWORK CLASSIFIER FOR DETECTION OF TRAVEL MODE ASSOCIATED WITH COMPUTING DEVICES

CROSS REFERENCE TO RELATED APPLICATIONS

This application is a continuation-in-part of U.S. patent application Ser. No. 15/724,875, entitled "PU CLASSIFIER FOR DETECTION OF TRAVEL MODE ASSOCIATED WITH COMPUTING DEVICES" and filed Oct. 4, 2017, which in turn is continuation-in-part of U.S. patent application Ser. No. 15/673,160, entitled "DETECTION OF TRAVEL MODE ASSOCIATED WITH COMPUTING DEVICES" and filed Aug. 9, 2017, both of which are incorporated by reference herein in their entireties. This application additionally claims priority to U.S. Provisional Patent Application Ser. No. 62/757,698, entitled "Neural Network for Classifying Traces" and filed on Nov. 8, 2018, which is likewise incorporated by reference herein in its entirety.

BACKGROUND

Digitally stored electronic maps are used to provide directions to users of mobile devices, for example, using any of a wide array of standalone map or direction application programs or applications. Today's electronic maps correctly determine where a mobile device is within a few feet or meters, and show where the user of that mobile device is on the electronic map in real time. Electronic maps also typically include other functionality, such as providing turn-by-turn directions to nearly any location. Additional elements such as traffic or wrecks may also be shown.

Electronic maps also appear in other applications aside from standalone mapping applications. For example, ride sharing applications, taxi applications, video games, and other applications may use digital maps. These or other applications can obtain electronic maps by calling a map server computer through an Application Programming Interface (API). Thus, a single electronic map provider that owns or operates the server computer may supply the electronic maps for many different applications.

When a mobile device is using an electronic map, the location of the mobile device can be determined using WiFi or the Global Positioning System (GPS), which reports a device location using latitude and longitude, and optionally height and time as well. This location data, as well as other data, may be collected by the electronic map provider and may be termed "telemetry" data for the mobile device. Other information, such as speed, direction of movement, acceleration, and deceleration may be calculated using the GPS data. This information, along with the location data, is very useful in providing traffic and route information, among other services.

Traffic and route information can be different depending on the mode of travel. For example, pedestrians and bicycles can use paths that are not accessible to a car. As another example, motor vehicle traffic on a road does not apply to pedestrians, and may apply differently to bicycles than to cars. When a mapping service receives data that it can use to build models (e.g., models of roadways and paths available to users, or models of traffic patterns or real-time traffic), it is important to assign the correct mode of travel to each set of received data so that it is applied to the correct model(s).

Currently available methods of detecting a mode of travel of a mobile computing device, based upon data received from the device, have been ineffective. One method involves calculating an average range of speed for each mode of travel. For example, drivers, cyclists, and pedestrians traveling on a city road may be calculated to typically travel between 17-27 miles per hour (mph), 7-16 mph, and 1-6 mph, respectively. An average speed of a particular device may be calculated, and the mode of travel that matches the device's average speed is assigned to the device. However, the average speed fails to account for a variety of situations. For example, heavy traffic may cause drivers to travel an average speed in the cyclist range. As another example, a runner may have an average speed in the lower end of the cyclist range. Therefore, a more accurate method of detecting mode of travel is needed.

SUMMARY

Systems and methods for providing an improvement in classifying inferred activities of mobile computing devices based upon movement data are provided herein. For example, data collected by a traveling device is processed and used to perform a classification of travel mode (e.g., a binary driving versus not driving classification, or a 3-way driving versus not driving vs. data noise classification) for the traveling device. The device generates trace data, which includes a series of location data, such as latitude-longitude coordinates, and a timestamp at which the device was at each set of coordinates. Based on this data, a system can calculate movement data, such as speed, acceleration, deceleration, and change of direction. These types of movement data are referred to herein as "metrics". Any other metrics describing the movement of the device can be used instead of, or in addition to, speed, acceleration, deceleration, and change of direction.

The amount of movement data for different trips can vary greatly based on how long the trip is and how often location-timestamp data is recorded. For example, some traces can have only tens of data points, while other traces can have many thousands or even more data points. To handle large and varying amounts of data, the systems and methods disclosed herein calculate a standard set of derived values from the calculated metrics and other data and provide the derived values as input to a classifier to determine whether the data represents a particular travel mode (e.g., driving).

The derived values may be a set of values corresponding to different metrics describing the movement of the device or statistics or other values calculated from the metrics or other trace data. In some cases, the metrics include quantile values. To generate quantile values, the system can sort all of the values for a particular metric in order, and identify the value at predetermined quantiles in the data. As used herein, a "quantile" or "quantile value" refers to a cutpoint that divides an ordered set of observed values. As a simple example, five quantile values may be calculated for a particular metric, e.g., quantile values that are one-fifths, two-fifths, three-fifths, four-fifths, and five-fifths (i.e., the top data point) through the data. These values also can also be referred to as the $20^{th}$, $40^{th}$, $60^{th}$, $80^{th}$, and $100^{th}$ percentiles of the data. The term quantile is more general than a percentile—for example, quantiles could include half-percentiles, a tenth-percentiles, or any other subdivision of a percentile. In addition to quantiles, other types of values can be derived from the metrics that are used by the classifier. For example, the classifier may classify data based on one or more of maximums, minimums, means, harmonic means, differences, or medians of any of the metrics. The classifier may also consider additional information, such as the hour or day of the week that the data was obtained, when classifying data. Additionally, different types of derived values can be used for different types of classifiers. For example, the derived values used by the binary PU classifier described below are derived from set of trace data as a whole; the derived values for neural networks and other classifiers, in contrast, are derived from subsets of N consecutive readings, as described later below.

Systems and methods are also disclosed herein for training a classification model used to classify a trace as representing or not representing a given mode of travel. The model may be a random forest model. The classification model can be a binary PU model trained on a positive set of data for which the mode of travel is already known based on the data source or human coding and an unlabeled set of data for which the mode of travel is unknown. The training may involve calculating a set of derived values from the trace data and training a binary PU classification model that is based on the derived values. In another embodiment, the classification model is a neural network, which in some embodiments is trained on a set of location data items representing the mode of travel of interest (e.g., driving), other modes of travel (e.g., walking, bicycling), and data noise (spurious data resulting from e.g. sensor misreadings).

In one embodiment, a method provides an improvement in classification of activities of mobile computing devices based upon data representing movement of the devices. The method involves receiving digital data corresponding to a trace by a device. The digital data includes location data and time data obtained over a period of time and representing movement of the device. The method further involves calculating a set of derived values for the plurality of metrics from the sets of values corresponding to the metrics, and comparing the set of derived values to a neural network classification model to determine whether the received digital data represents movement of a first type. The neural network classification model was trained using at least a first set of traces that represent the first type of movement. In response to determining that the digital data represents movement of the first type, the received digital data corresponding to the trace is labelled with the first type of movement.

Classification using the techniques set forth herein is particularly advantageous in the context of anonymized data. For example, some systems retain information such as travel route source and destination, user ID, vehicle ID, or the like, which permits directly or indirectly determining user identity and/or vehicle type. Although this makes it easier for the systems to perform analysis, it reduces user privacy. Thus, some other systems may perform anonymization of their user data—such as removing information designating the user's ID, the source and destination of the user route, or the like—to enhance the privacy of their users. By doing so, however, such systems lose the ability to (for example) infer the type of movement based on patterns of known users. Thus, the classification disclosed herein, which can operate on anonymized route data, without knowledge of user-identifying information, is of particular value in such systems.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Computer-implemented techniques are provided for classifying activities of a mobile computing device based on data representing movement of the device. The activities may be various modes of travel, such as walking, bicycling, or driving. Additional modes of travel may also be identified, e.g., running, roller skating, skateboarding, traveling by bus, traveling by train, flying, etc. In various embodiments, digital data corresponding to a trace collected by a device is received. The digital data includes a set of values for each of a plurality of metrics. For example, the digital data may include sets of values for some or all of speed, acceleration, deceleration, and change in direction. The digital data can be generated from raw trace data that includes location data and corresponding time stamps. For example, the location data may include longitude-latitude coordinates calculated by a GPS module on the device, with the time stamps representing times at which the device was located at each pair of longitude-latitude coordinates.

Based on the set of values for the plurality of received metrics, a set of derived values for the plurality of metrics is calculated. In some embodiments, the set of derived values is a set of vectors of quantile values, each vector corresponding to one of the metrics. For example, if the set of digital data includes metrics for speed, acceleration, deceleration, and change in direction, then the derived values will include four vectors of quantile values, one each for speed, acceleration, deceleration, and change in direction. Calculating a vector for a metric can involve ordering the set of values for the metric and determining a quantile value for each of a predetermined set of quantile values. For example, calculating an acceleration vector involves ordering all of the acceleration values from lowest to highest, and identifying the values at certain quantiles. The quantiles divide the ordered data set into any number of intervals, and the intervals may or may not be evenly spaced. For example, the quantiles may divide the ordered data into 10 intervals (i.e., deciles), 20 intervals (i.e., ventiles), 100 intervals (i.e., percentiles), or more than 100 intervals. For example, if the model uses deciles, the quantiles identified would be at the $10^{th}$ percentile, $20^{th}$ percentile, $30^{th}$ percentile, and so forth. In some cases, a quantile may fall between two data points (e.g., the median falls between two numbers for a data set with an even number of values), so the quantile value can be determined by selecting either of the two data points that it falls between, taking an average of the two data points, or another manner. The number of quantiles is the same as the length of the derived vector. The vector may be normalized so that all of the values in the vector fall between 0 and 1. Deriving a vector is described in further detail with respect to FIG. 3.

In some embodiments, the values for the metrics are computed on the mobile computing device and provided to a server computer, which then performs additional operations, such as the computation of the derived values. In other embodiments, the computation of the values for the metrics, and of the derived values, is performed on the same computing device, such as a server computer.

The metrics, and/or the derived values, may be calculated from different subsets of the trace data in different embodiments. For example, in one embodiment the derived values are calculated from subsets of the data for N consecutive readings (a tuple containing location and time values) from the trace data (e.g. N=3), with K readings overlapping between subsets (e.g., K=1). For example, for embodiments in which N=3 and K=1, the first subset from which derived values are calculated would include the first, second and third readings; the second subset would include the third, fourth, and fifth readings; the third subset would include the fifth, sixth, and seventh readings; and so on. In general, having greater degrees of overlap K between subsets means that more of the trace data is analyzed, but also that there is a greater degree of "noise" data. Conversely, having lesser degrees of overlap K between subsets means reduces the amount of noise by smoothing the derived values, but also has the ability to analyze less data.

The set of derived values (e.g., the quantile vectors) are compared to a machine learning model. In embodiments in which the machine learning model is trained using a plurality of travel modes, the model may then calculate a confidence score for each travel mode based on the derived values (e.g., the quantile values of all of the available metrics, e.g., speed, acceleration, deceleration, and change in direction). The machine learning model may apply weights to the derived values or intermediate values to determine the confidence level; for example, the highest quantile speed may be less useful than the median acceleration for determining whether the travel mode is bicycle, so the highest quantile speed may be weighted lower than the median acceleration in determining the confidence score that the device is traveling by bicycle. The training of the machine learning model is described in detail with respect to FIG. 5.

In response to a confidence score for a first travel mode meeting a threshold value for the first travel mode, the received digital data corresponding to the trace is labelled with the first travel mode. For example, if the threshold confidence score to label data as driving data is 0.85, and the calculated confidence score for driving is 0.93, the data is labelled as driving data. Different travel modes may have different confidence levels. In most cases, the confidence level of one travel mode will be high, and the other confidence levels will be low. If the data is unclear (e.g., if the device was mostly stationary), all confidence levels may be low, and the data is not labelled. In response to labeling the data with the driving mode, the data may be added to a database related to driving, e.g., a database used to determine traffic conditions, or a database used to identify roadways.

Detecting activities in this way is more effective and accurate than relying only on speed statistics, such as minimum, maximum, and average speed. For example, a driver and a cyclist may both have the same average speed, such as 15 mph. A system relying solely on average speed would likely consider both to be bicyclists. However, using the methods described herein, it may be observed that the driver traveled at or near a top speed of a road such as 25 mph for an extended period of time while the cyclist traveled at or near a similar top speed such as 20 mph for only a few moments, for example, when the cyclist was going down a hill. It may also be observed that the driver typically has higher accelerations than the cyclist. Because traveling at or near top speed for an extended period of time and accelerating quickly is easier for drivers than cyclists, the system may predict with a high level of certainty that the mobile device is associated with a motor vehicle and not a bicycle or that the mode of travel or activity is motor vehicle travel rather than bicycling.

The systems and methods described here have significantly higher accuracy than travel mode detection based on prior methods that compared summary statistics of movement data (e.g., average speed, acceleration, and deceleration) to ranges associated with different travel modes.

Other embodiments, aspects and features will become apparent from the disclosure as a whole.

Figure 1:
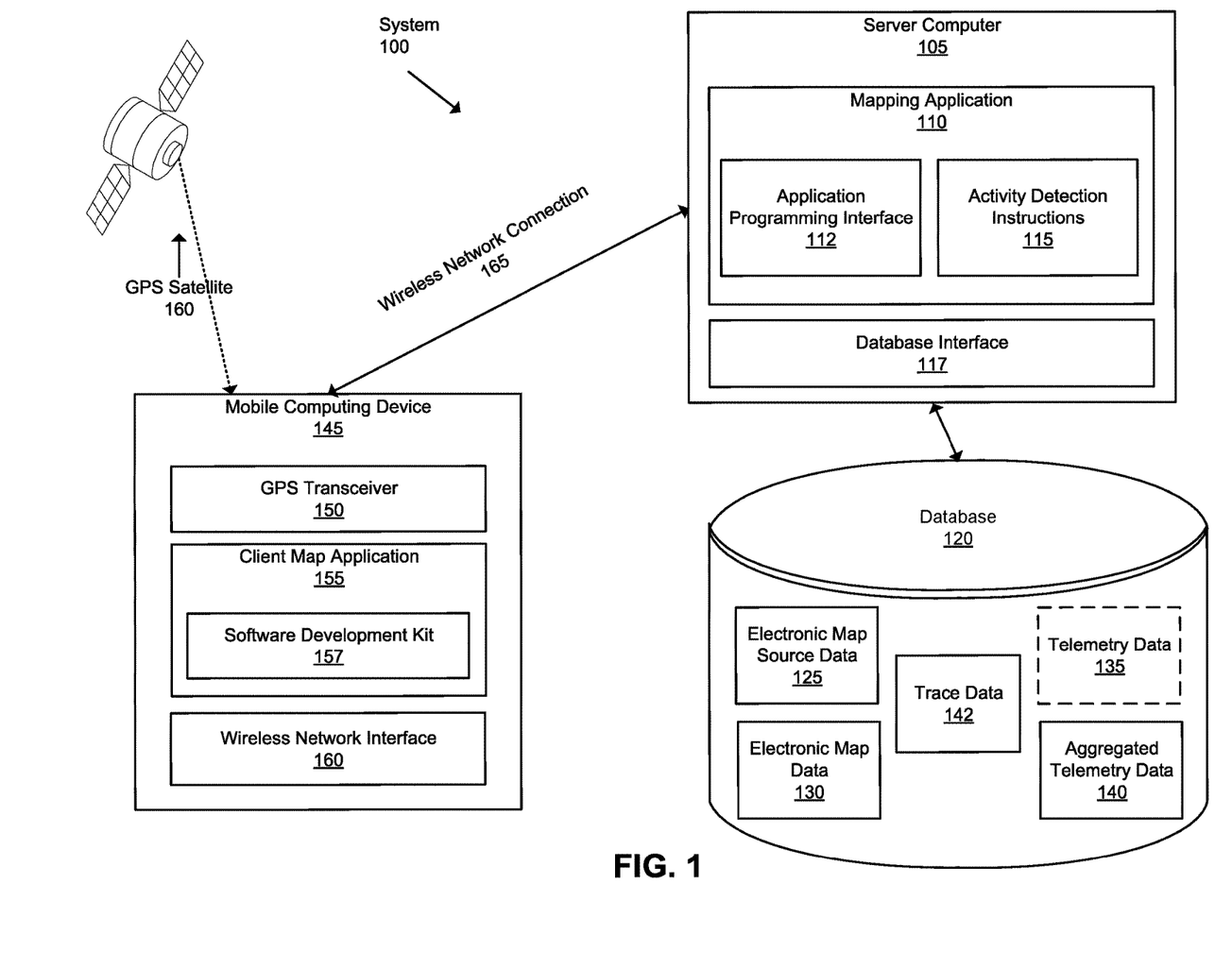
FIG. 1 illustrates an example computer system in which the techniques described may be practiced, in an embodiment.

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a mobile computing device 145 that is coupled via a wireless network connection 165 to a server computer 105, which is coupled to a database 120. A GPS satellite 160 is coupled via a wireless connection to the mobile computing device 145. The server computer 105 comprises a mapping application 110, an application programming interface (API) 112, activity detection instructions 115, and a database interface 117. The database 120 comprises electronic map source data 125, electronic map data 130, telemetry data 135, aggregated telemetry data 140, and trace data 142. The mobile computing device 145 comprises a GPS transceiver 150, client map application 155, software development kit (SDK) 157 and wireless network interface 160.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the server computer 105 broadly represents one or multiple server computers, such as a server cluster, and the server computer may be located in one or more physical locations. Server computer 105 also may represent one or more virtual computing instances that execute using one or more computers in a datacenter such as a virtual server farm.

Server computer 105 is communicatively connected to database 120 and mobile computing device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of custom software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1, database 120 may span multiple devices located in one or more physical locations. For example, database 120 may include one or nodes located at one or more data warehouses. Additionally, in one embodiment, database 120 may be located on the same device or devices as server computer 105. Alternatively, database 120 may be located on a separate device or devices from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, telemetry data 135, and aggregated telemetry data 140. These datasets may be stored as columnar data in a relational database or as flat files.

In one embodiment, electronic map source data 125 is raw digital map data that is obtained, downloaded or received from a variety of sources. The raw digital map data may include satellite images, digital street data, building or place data or terrain data. Example sources include National Aeronautics and Space Administration (NASA), United States Geological Survey (USGS), and DigitalGlobe. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector tiles which may be subject to style data to impose different display styles. Electronic map data 130 may be updated at any suitable interval, and may include additional information beyond that derived from electronic map source data 125. For example, using aggregated telemetry data 140, discussed below, various additional information may be stored in the vector tiles, such as traffic patterns, turn restrictions, detours, common or popular routes, speed limits, new streets, and any other information related to electronic maps or the use of electronic maps.

In one embodiment, telemetry data 135 is digital data that is obtained or received from mobile computing devices via function calls that are included in a Software Development Kit (SDK) that application developers use to integrate and include electronic maps in applications. As indicated by the dotted lines, telemetry data 135 may be transiently stored, and is processed as discussed below before storage as aggregated telemetry data 140.

The telemetry data may include mobile device location information based on GPS signals. For example, telemetry data 135 may comprise one or more digitally stored events, in which each event comprises a plurality of event attribute values. Telemetry events may include: session start, map load, map pan, map zoom, map tilt or rotate, location report, speed and heading report, or a visit event including dwell time plus location. Telemetry event attributes may include latitude-longitude values for the then-current position of the mobile device, a session identifier, instance identifier, application identifier, device data, connectivity data, view data, and timestamp.

In one embodiment, aggregated telemetry data 140 is telemetry data 135 that has been processed using anonymization, chunking, filtering, or a combination thereof. Anonymization may include removing any data that identifies a specific mobile device or person. Chunking may include segmenting a continuous set of related telemetry data into different segments or chunks representing portions of travel along a route. For example, telemetry data may be collected during a drive from John's house to John's office. Chunking may break that continuous set of telemetry data into multiple chunks so that, rather than consisting of one continuous trace, John's trip may be from John's house to point A, a separate trip from point A to point B, and another separate trip from point B to John's office. Chunking may also remove or obscure start points, end points, or otherwise break telemetry data into any size. Filtering may remove inconsistent or irregular data, delete traces or trips that lack sufficient data points, or exclude any type or portion of data for any reason. Once processed, aggregated telemetry data 140 is stored in association with one or more tiles related to electronic map data 130. Aggregated telemetry data 140 may be stored for any amount of time, such as a day, a week, or more. Aggregated telemetry data 140 may be further processed or used by various applications or functions as needed.

In one embodiment, mobile computing device 145 is any mobile computing device, such as a laptop computer, handheld computer, wearable computer, cellular or mobile phone, portable digital assistant (PDAs), or tablet computer. Although a single mobile computing device is depicted in FIG. 1, any number of mobile computing devices may be present. Each mobile computing device 145 is communicatively connected to server computer 105 through wireless network connection 165 which comprises any combination of a LAN, a WAN, one or more internetworks such as the public Internet, a cellular network, or a company network.

Mobile computing device 145 is communicatively coupled to GPS satellite 160 using GPS transceiver 150.

GPS transceiver 150 is a transceiver used by mobile computing device 145 to receive signals from GPS satellite 160, which broadly represents three or more satellites from which the mobile computing device may receive signals for resolution into a latitude-longitude position via triangulation calculations.

Mobile computing device 145 also includes wireless network interface 160 which is used by the mobile computing device to communicate wirelessly with other devices. In particular, wireless network interface 160 is used to establish wireless network connection 165 to server computer 105. Wireless network interface 160 may use WiFi, WiMAX, Bluetooth, ZigBee, cellular standards, or others.

Mobile computing device 145 also includes other hardware elements, such as one or more input devices, memory, processors, and the like, which are not depicted in FIG. 1. Mobile computing device 145 also includes applications, software, and other executable instructions to facilitate various aspects of embodiments described herein. These applications, software, and other executable instructions may be installed by a user, owner, manufacturer, or other entity related to mobile computing device. In one embodiment, mobile computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In server computer 105, the mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: sending electronic map data to mobile computing devices, receiving telemetry data 135 from mobile computing devices, receiving trace data 142 from mobile computing devices, processing telemetry data to generate aggregated telemetry data 140, receiving electronic map source data 125 from data providers, processing electronic map source data 125 to generate electronic map data 130, and any other aspects of embodiments described herein. Mapping application 110 includes activity detection instructions 115 which are programmed or configured to determine the activity or travel mode of the mobile computing device 145 based on trace data 142 received from the mobile computing device 145. In some embodiments, the mapping application 110 includes activity detection instructions 115 for performing a classification of the trace data 142 as representing or not representing a particular travel mode, as discussed with respect to FIGS. 6 and 7.

According to one embodiment, the techniques described herein are implemented by one or more special-purpose computing devices. For example, the server computer 105 and mobile computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 2:
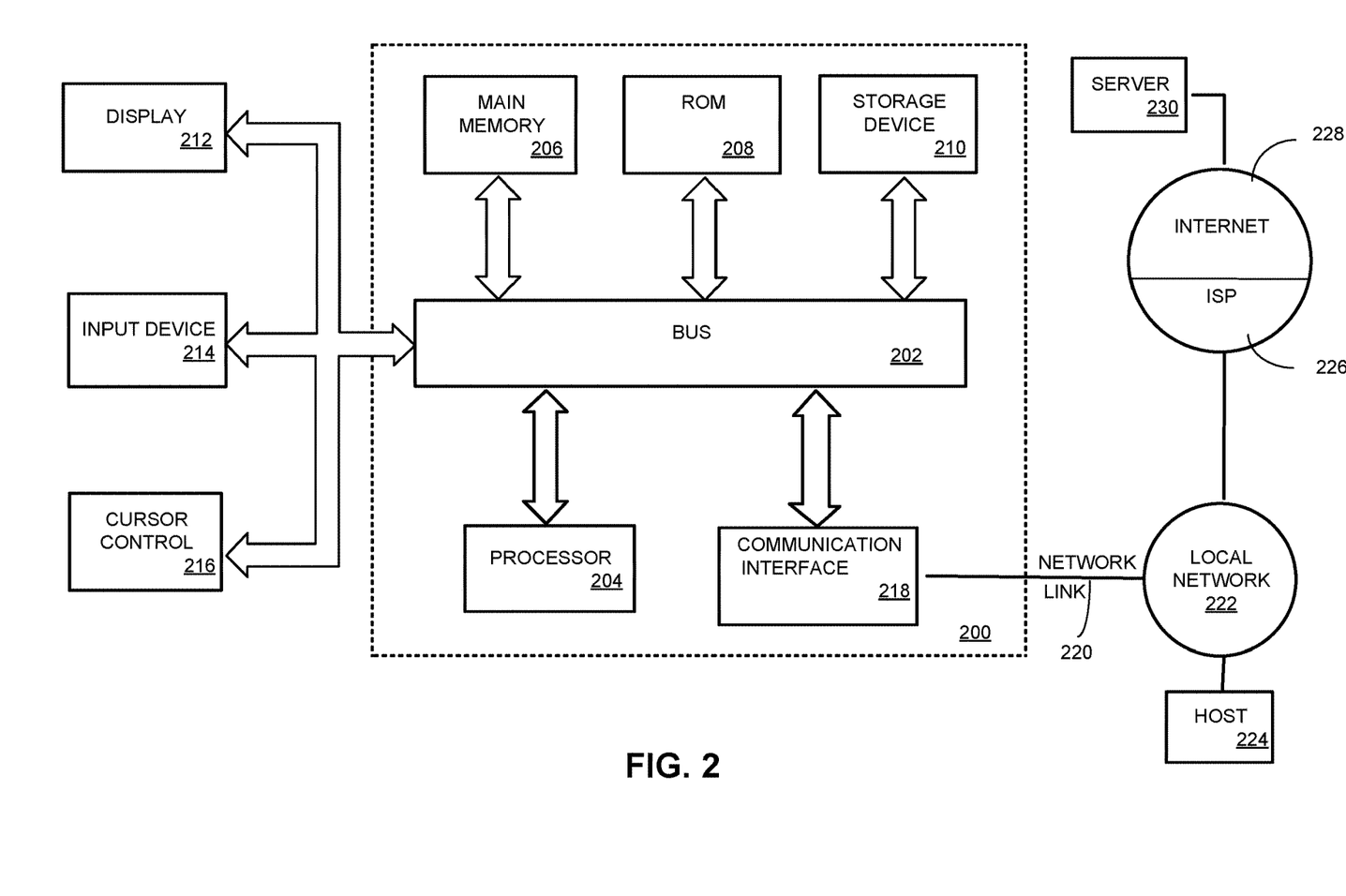
FIG. 2 illustrates a computer system upon which an embodiment may be implemented, in an embodiment.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a LCD screen, LED screen, or touch screen, for displaying information to a computer user. An input device 214, which may include alphanumeric and other keys, buttons, a mouse, a touchscreen, or other input elements is coupled to bus 202 for communicating information and command selections to processor 204. In some embodiments, the computer system 200 may also include a cursor control 216, such as a mouse, a trackball, or cursor direction keys for communicating direction information and command selections to processor 204 and for controlling cursor movement on display 212. The cursor control 216 typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received, and stored in storage device 210, or other non-volatile storage for later execution.

In one embodiment, the activity detection instructions 115 include instructions for calculating a set of derived values for multiple different movement metrics from received data, comparing the derived values to a trained model, and determining whether the received data corresponds to a travel mode. An example process carried out by the activity detection instructions is described with respect to FIG. 4. The instructions for calculating the set of derived values for the movement metrics may include instructions to order the received data and determine quantiles within the ordered data. One method for calculating the derived values is described with respect to FIG. 3. The activity detection instructions 115 may further include instructions for generating the trained model. An example process for generating the trained model is described with respect to FIG. 5. The activity detection instructions 115 may additionally, or alternatively, include instructions for training a classification model, such as a neural network or PU classifier, for classification of travel mode (e.g., driving versus not driving). An exemplary process for generating the classifier is described with respect to FIG. 6. The activity detection instructions 115 may further include instructions for classifying a trace as a driving trace using a classifier. An exemplary process for classifying a trace as a driving trace using a PU classifier is described with respect to FIG. 7.

Figure 3:
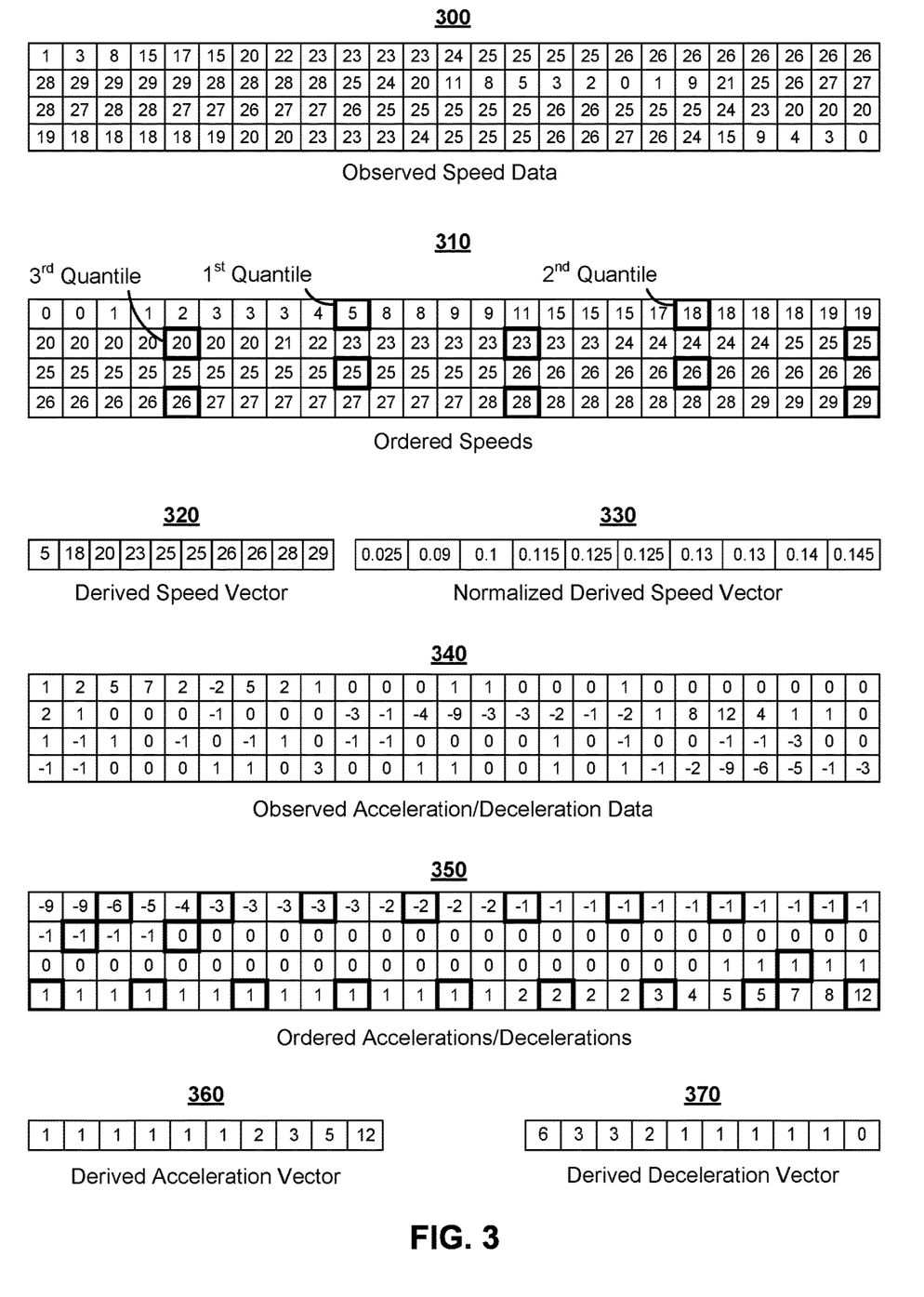
FIG. 3 illustrates generating three derived vectors from observed movement data, in an embodiment.

FIG. 3 illustrates generating three derived vectors from observed movement data, in an embodiment. In particular, FIG. 3 illustrates generating a normalized derived speed vector 330 from observed speed data 300, and generating a derived acceleration vector 360 and derived deceleration vector 370 from observed acceleration/deceleration data 340.

Observed speed data 300 includes 100 data points representing speeds of a device, such as the mobile computing device 145, during a trip. The data points are sequential in time, moving along each row and, after the end of a row, moving to the next row. The observed speed data 300 may be obtained from data of a trace of the mobile computing device 145 by dividing the distance between each sequential pair of points in the trace by the difference in time between the pairs of points. In other embodiments, the trace data includes speed measurements obtained by the mobile computing device 145. The observed speed data may be measured in miles per hour (mph), kilometers per hour (kph), or any other unit. The observed speed data 300 shows an acceleration at the beginning of the trace, followed by a deceleration, stop, and re-acceleration right before the middle of the trace, and a deceleration at the end of the trace. The observed speed data 300 has a steady speed of around 25-27 mph when traveling between accelerations and decelerations. This could represent a car or possibly a fast bicyclist traveling, stopping at a stop sign, traveling again, and stopping again.

A set of ordered speeds 310 is generated by ordering the observed speed data 300 from the lowest value to the highest value. Within the ordered speeds 310, ten data points are marked off with boxes. These data points mark off quantiles (in this case, deciles) within the ordered speeds 310. For example, the value at the first quantile is 4, the value at the second quantile is 18, and the value at the third quantile is 20. Each of the 10 quantiles can be extracted to create a derived speed vector 320. The derived speed vector 320 provides a summary of the observed speeds 300 that characterizes the speeds observed by the mobile computing device 145. The derived speed vector 320 provides more information about the observed speeds 300 than simple statistics (e.g., mean, median, maximum, and minimum) with a relatively low amount of data.

In some embodiments, the machine learning model is configured to accept as input only vectors that are normalized, i.e., vectors with values between 0 and 1. A normalized derived speed vector 330 can be generated by dividing the observed speed vector 320 by a predetermined number, such as a maximum reasonable speed above which any observations are assumed to be faulty and discarded. In the example of FIG. 3, the maximum reasonable speed is 200 mph, so the normalized derived speed vector 330 is obtained by dividing the derived speed vector 320 by 200. The maximum reasonable speed may be set higher or lower based on the range of possible speeds; for example, if the device may also be detected flying, a maximum reasonable speed may be set around 600 mph.

Similar normalized vectors can be derived for other kinds of data, e.g., acceleration, deceleration, and change of direction. Change in direction can be calculated by determining two directions of movement (i.e., the direction of movement between one pair of points, and the direction of movement between the next pair of points) and determining the difference in the direction in degrees, radians, or another unit. Acceleration and deceleration can be calculated based on the observed speed data 300 or the raw trace data.

In the example shown in FIG. 3, acceleration/deceleration data 340 is derived from the observed speed data 300. The observed acceleration/deceleration data 340 includes 100 data points that are shown sequentially in time. Observed accelerations are positive values, and observed decelerations are negative values. A zero in the observed acceleration/deceleration data 340 represents no change in speed between two points.

As with the observed speed data 300, the acceleration/deceleration data 340 is sorted from low to high to generate the ordered acceleration/decelerations 350. 29 data points (the negative data points) show deceleration, and 30 data points (the positive data points) show acceleration. Within the ordered acceleration/decelerations 350, quantiles for the acceleration data and quantiles for the deceleration data are marked. In this example, an additional data point was added to the deceleration subset so that 10 evenly-spaced deceleration quantiles could be selected, with the top quantile having a value of 0. Alternatively, the deceleration quantiles could be calculated by interpolating values between the observed decelerations or using other methods.

The marked percentiles are used to generate the derived acceleration vector 360 and the derived deceleration vector 370. The values in the deceleration vector are made positive (i.e., the absolute value was determined) so that the vector received by the model does not include negative numbers. In some embodiments, order of data for deceleration may be flipped, so that the highest deceleration (i.e., the most negative number) has the highest quantile. As with the derived speed vector 320, the derived acceleration vector 360 and the derived deceleration vector 370 can be normalized based on a maximum reasonable acceleration or deceleration, e.g., 40 mph per second. In some embodiments, a combined acceleration/deceleration vector may alternatively be generated and input to the model.

The length of the derived speed vector 320 and the derived acceleration vector 360 and deceleration vector 370 (i.e., the number of quantiles used) can be selected as a trade-off between performance and computational time and effort. Longer derived vectors 320, 360, and 370 provide more information about the distributions for the metrics and, therefore, may provide more accurate confidence scores. However, using longer derived vectors 320, 360, and 370 makes the model more complex and increases the time to calculate the confidence scores. While vectors 320, 360, and 370 are all shown as being the same length and using the same number of quantiles, different numbers of quantiles may be used for different metrics, so different vectors may be of different lengths.

Figure 4:
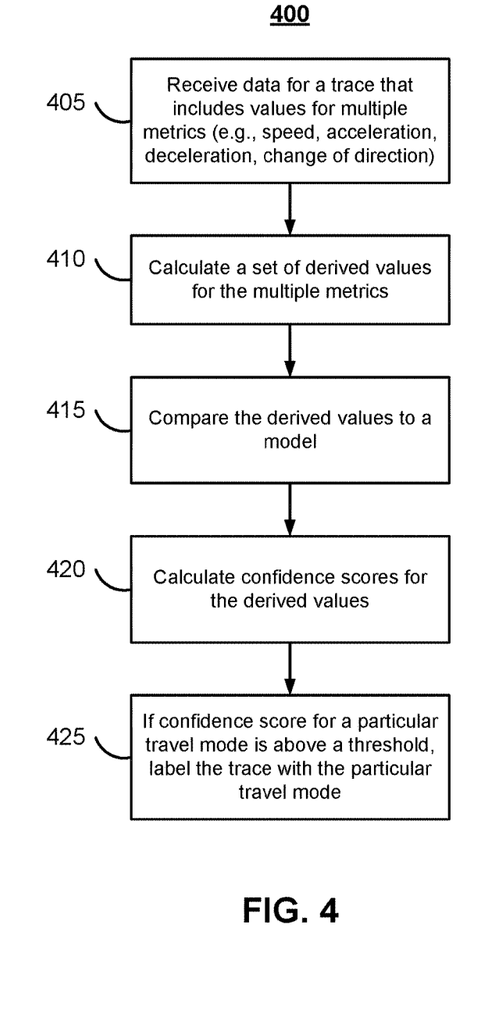
FIG. 4 shows a process for determining a travel mode for a trace and labeling the trace with the travel mode, in an embodiment.

FIG. 4 shows a process for determining a travel mode for a trace and labeling the trace with the travel mode, in an embodiment. In various embodiments, the operations of the process 400 of FIG. 4 may be implemented in programming by a server computer 105 or its components as described herein. For example, the operations of process 400 may be performed by the mapping application 110 according to the activity detection instructions 115. In some examples, the server computer 105 may execute a set of instructions or sequence of instructions (e.g., the activity detection instructions 115) to control the functional elements of the server computer 105 to perform the functions described below. Additionally or alternatively, the server computer 105 may perform aspects of the functions described below using special-purpose hardware. In some embodiments, the activity detection instructions 115 may instruct the server computer 105 to interact with the database 120 to perform the functions described below using database interface 117. In some embodiments, one or more functions described below may be performed by the mobile computing device 145 or another device.

At 405, the server computer 105 executing the mapping application 110 with the activity detection instructions 115 receives data for a trace 142 that includes values for multiple metrics, such as speed, acceleration, deceleration, and change of direction. In some embodiments, the server computer 105 computes these metrics from trace data, which typically includes at least a series of locations and timestamps. In some embodiments, the mobile computing device 145 generates one or more of the metrics and transmits the metrics to the server computer 105.

At 410, the server computer 105 executing the mapping application 110 with the activity detection instructions 115 calculates a set of derived values, such as quantile values, for the multiple metrics. For example, the server computer 105 can generate derived vectors for speed, acceleration, deceleration, and change of direction; these derived vectors summarize the distribution of these metrics. If the model is configured to receive data between 0 and 1, the server computer 105 can normalize the vectors by dividing each derived value by a predetermined value (e.g., a maximum reasonable value) and, in some cases, take the absolute value of the derived values. The generation of normalized derived values is described in greater detail with respect to FIG. 3. In some embodiments, the server computer 105 calculates different or additional derived values for the metrics, such as a mean, harmonic mean, average, median, mode, maximum, or minimum values.

Figure 5:
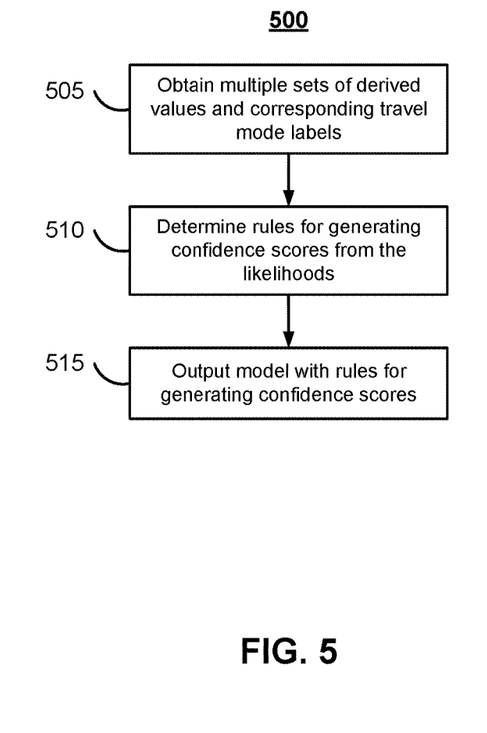
FIG. 5 shows a process for training a model for generating travel mode confidence scores for movement data, in an embodiment.

At 415, the server computer 105 executing the mapping application 110 with the activity detection instructions 115 compares the derived values to a model such as the model trained by the process shown in FIG. 5. The model may be trained using machine learning, and it may be, for example, a neural network, a decision tree, Bayesian network, classifier system, or any other type of machine learning network or system. In some embodiments, the activity detection instructions 115 compare the derived values to several models. For example, the server computer 105 may use a different classifier for each of various travel mode (e.g., driving, walking, cycling, etc.). In some embodiments, the model is trained using data obtained from multiple different travel modes.

At 420, the server computer 105 executing the mapping application 110 with the activity detection instructions 115 calculates confidence scores for the derived values, each corresponding to one or more travel modes. For example, if four derived vectors are each 100 values long (for a total of 400 derived values), the machine learning model may apply weights learned during training of the model to these values, and combine the 400 weighted values according to a formula or algorithm learned during training of the model to calculate a confidence score for each travel mode for which model training took place. For example, the model may learn that a high quantile for change of direction is more predictive, and therefore should be weighted more heavily, than a low quantile for change of direction; this may have been learned because most modes of travel involve at least travel along a straight line, so the training data for all travel modes had very small changes of direction in the lower quantiles. In some embodiments, calculating the confidence score involves calculating, from the quantile values, a set of intermediate values, such as votes or probabilities, which are combined to generate a confidence score. The training of the machine learning model is described with respect to FIG. 5.

In some embodiments, such as some in which a neural network model is employed, the model is a 3-class model that outputs a confidence score for each of (a) whether the derived values indicate the mode of travel, (b) whether the derived values indicate a different mode of travel, or (c) whether the derived values indicate data noise (e.g., temporarily incorrect location data produced by sensor errors, such as a sharp and temporary change in location), rather than actual travel.

At 425, the server computer 105 executing the mapping application 110 with the activity detection instructions 115 determines whether the confidence score for a particular travel mode is above a threshold, and if so, labels the trace with the particular travel mode. In most cases, the confidence score of one travel mode will be high, and (in cases of models producing scores for many different types of travel mode) the other confidence scores will be low. For example, a set of confidence scores may be 0.93 for driving, 0.06 for bicycling, and 0.01 for walking/running. If the threshold confidence score to label data as driving data is 0.85, and the calculated confidence score for driving is 0.93, the trace is labelled as a driving trace, or data derived from the trace may be labeled as driving data. Different travel modes may have different threshold confidence levels. If the data is unclear (e.g., if the device was mostly stationary), all confidence levels may be low, and the trace is not labelled.

In response to labeling the data with the driving mode, the data may be added to a database related to driving, e.g., a database used to determine traffic conditions, or a database used to identify roadways. In some embodiments, the machine learning model may operate differently from the model described in process 400. For example, the model may not output a confidence score, and instead may output the most likely mode of travel.

FIG. 5 shows a process for training a model for generating travel mode confidence scores for movement data, according to one embodiment. In various embodiments, the operations of the process 500 of FIG. 5 may be implemented in programming by a server computer 105 or its components as described herein. For example, the operations of process 500 may be performed by the mapping application 110 according to the activity detection instructions 115. In some examples, the server computer 105 may execute a set of instructions or sequence of instructions (e.g., the activity detection instructions 115) to control the functional elements of the server computer 105 to perform the functions described below. Additionally or alternatively, the server computer 105 may perform aspects of the functions described below using special-purpose hardware. In some embodiments, the activity detection instructions 115 may instruct the server computer 105 to interact with the database 120 to perform the functions described below using database interface 117.

At 505, the server computer 105 executing the mapping application 110 with the activity detection instructions 115 obtains multiple sets of derived values and corresponding travel mode labels. The activity detection instructions 115 may calculate the derived values from either raw trace data or from the values for the various metrics that will be used by the model (e.g., speed, acceleration, deceleration, change of direction), as described with respect to FIG. 3. The corresponding travel mode labels for each data set may be provided by users that manually input the travel mode. Additionally, in some embodiments some data sources may be associated with a particular travel mode without manual input; for example, data received from a ride sharing app can be assumed to be driving data, while data received from a running fitness app can be assumed to be running/walking data.

At 510, the server computer 105 executing the mapping application 110 with the activity detection instructions 115 determines rules for calculating confidence scores that derived values correspond to each travel mode for which the machine learning model will be trained. The rules include a set of values and operations internal to the model that the model uses to classify input data. For example, as described with respect to FIG. 4, the machine learning model can learn during training that certain quantile-metric pairs are more predictive than others, and determine rules for calculating the confidence scores that give more weight to certain quantile values than to others. The machine learning model can learn rules for calculating a set of intermediate values from the quantile values; these intermediate values may include, for example, probabilities, votes for particular travel modes, weighted values, or any other value that can be used directly or indirectly to calculate a confidence score. The rules for generating the confidence scores for different travel modes may be separate or interrelated.

The server computer 105 may create any type of model that analyzes the input vectors and outputs a travel mode or an output that can be used to select a travel mode. For example, a neural network may be used if many data sets will need to be compared to the trained model because a neural network provides relatively fast classification of received data. In a neural network, signals from an input neuron layer, which receives the input vectors, are passed to one or more neuron layers internal to the model to process the inputs and output the confidence scores. If a neural network is used, at 510, the neural network learns rules that are applied by the internal neuron layers. As described with respect to FIG. 4, other machine learning systems or models may be used. In some embodiments, the model is not trained to output confidence scores, but instead is trained to output a mode of travel (e.g., the most likely mode of travel) or, in some cases, no mode of travel if no mode can be determined, or an indication that the derived values input to the model represent data noise.

At 515, the server computer 105 executing the mapping application 110 with the activity detection instructions 115 outputs a model with rules for generating the confidence scores. This model will be used by the server computer 105 to classify received data that is not labelled with the travel mode. The server computer 105 may retrain or further train the machine learning model based on additional labelled data.

As mentioned above with respect to FIG. 4, the model may be a classifier model, and the server computer 105 may use a different classifier for each type of travel mode. In one particular embodiment, the activity detection instructions 115 may include one or more binary classifier models used to determine whether or not trace data 142 represents data of a given travel mode, e.g., a driving trace. In some embodiments, the server computer 105 may include multiple binary classifier models, e.g., one binary classifier for classifying traces as driving or non-driving, another binary classifier for classifying traces as biking or non-biking, another binary classifier for classifying traces as walking or not walking, etc. The embodiments in FIGS. 6 and 7, discussed below, are described with respect to a binary classifier for determining whether a trace represents a driving trace or not; however, it should be understood that similar classifiers may be generated and used to label traces for other driving modes.

Figure 6:
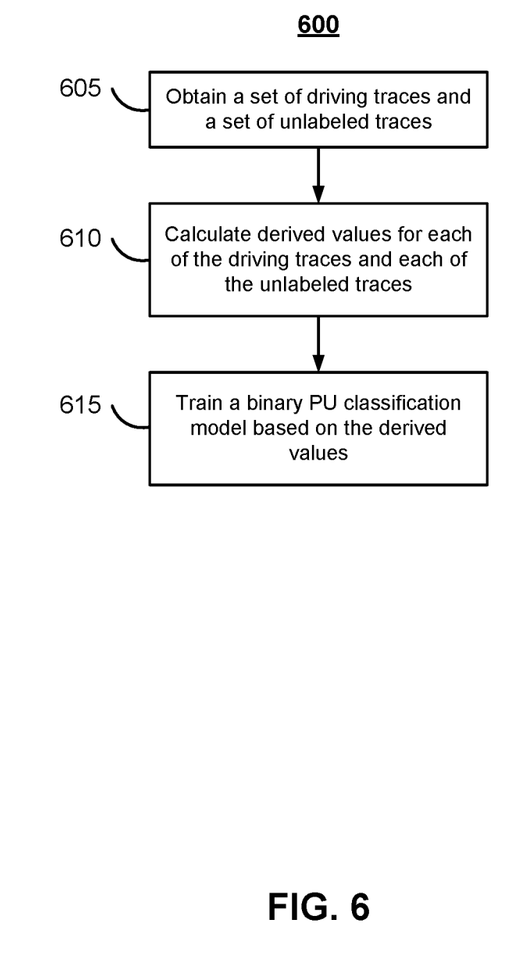
FIG. 6 shows a process for training a binary classification model for classifying a trace as a driving trace, in an embodiment.

FIG. 6 shows a process 600 for training a binary classification model for classifying a trace as a driving trace, in an embodiment. The process 600 creates a PU classifier, which generally refers to any binary classifier that is learned from two sets of samples: a set of positive samples, and a set of unlabeled, or mixed, samples. The set of unlabeled samples is assumed to contain both positive and negative samples, but the individual samples are not identified as being positive or negative. A PU classifier that classifies traces as driving traces or non-driving traces is trained using a set of positive traces (i.e., traces that are known to have been obtained while driving) and unlabeled traces (i.e., traces for which the type of movement is unknown).

At 605, the server computer 105 executing the mapping application 110 with the activity detection instructions 115 obtains a set of driving traces and a set of unlabeled traces. As described with respect to FIG. 5, in some cases, some traces are manually labeled by users, and some data sources can be associated with a particular travel mode without manual input. For example, data received from a ride sharing app can be assumed to be driving data. Traces that are manually labeled as driving traces, and/or traces that can safely be assumed to be driving traces based on the source of the traces, can be used to form the set of positive driving traces. Traces that have not been manually labeled and that come from a source from which a travel mode cannot be inferred can be used to form the set of unlabeled traces.

To train a PU classifier, the unlabeled traces can be taken from a source that would be expected to provide both driving and non-driving traces, such as a generic mapping or routing app. Alternatively, the unlabeled traces can be obtained from a set of users that includes both drivers and non-drivers, or that includes users that drive some but not all of the time. A source that would not be expected to include any driving traces would not be suitable as the only source for the unlabeled set, but it could be combined with other traces that would include at least some driving traces to generate the mixed set. For example, unlabeled traces from a fitness app that can be used for walking, running, and biking would not be expected to include any driving traces, but these traces could be combined with another set of traces that is expected to include at least some driving traces to generate the unlabeled set.

At 610, the server computer 105 executing the mapping application 110 with the activity detection instructions 115 calculates derived values for each of the driving traces and each of the unlabeled traces. The derived values may include any of the derived values described with respect to FIG. 4, such as quintile values for speed, acceleration, deceleration, and change of direction metrics, or other values, such as a mean, harmonic mean, average, median, mode, maximum, or minimum values of the speed, acceleration, deceleration, and change of direction metrics. Certain derived values may also combine the various metrics, such as the harmonic mean of speed multiplied by acceleration. Some derived values may involve taking the absolute value of a metric, e.g., harmonic mean of absolute value of acceleration, minimum absolute value of acceleration, maximum absolute value of acceleration, etc. The derived values may also look at the geometry of the trace, e.g., to determine a distance ratio, which measures the noisiness of the trace. The distance ratio may be calculated by dividing the distance between the start and end of the trace "as the crow flies" by the distance measured by connecting the points in the trace. Another derived value may include the speed breadth, which measures the variance in speed. The speed breadth may be calculated by subtracting the minimum speed (or a speed near the minimum speed) from the maximum speed (or a speed near the maximum speed). In addition to deriving values from the trace data, the server computer 105 may also identify other data in the trace that may be relevant for classifying the trace, such as the weekday or time of day at which the trace was obtained, and include these in the calculated derived values for consideration in the model.

At 615, the server computer 105 executing the mapping application 110 with the activity detection instructions 115 trains a binary classification model based on the derived values. For example, the server computer 105 may use machine learning techniques, such as supervised or semi-supervised learning techniques, to analyze the positive and unlabeled sample data and infer how strongly associated the various derived values are with the labeled driving traces, and to generate the binary classifier based on how derived values are associated with driving traces. In some embodiments, the trained binary classification model uses all of the derived values to classify a trace; in other embodiments, the trained binary classification model uses a portion of the derived values to classify a trace, e.g., if some of the derived values are not associated with either driving or non-driving traces, or if a subset of derived values were determined to be relevant or important in classifying a trace as driving or non-driving.

Various machine learning techniques can be used to train the binary PU classification model at 615. A PU wrapper, which adapts a classifier so that it can be trained using a data set with a set of positive samples and a set of unlabeled samples, can be wrapped around various classification models. For example, the activity detection instructions 115 can include instructions for generating a decision tree classifier, which uses at least a subset of the derived values as inputs to the trained decision tree. As another example, the activity detection instructions 115 can include instructions for training a neural net that receives at least a subset of the derived values as inputs to the trained neural net.

In one particular embodiment, a random forest method is used to train the PU binary classification model. The random forest method involves constructing multiple decision trees and aggregating or combining the results of the decision trees to determine the class (here, driving or non-driving). In a random forest, each decision tree is trained using a different randomly-selected portion of the derived values. Thus, each decision tree is an independent classification model, and different decision trees within the random forest may reach opposite conclusions for a single trace.

When used to classify data, each trained decision tree in the random forest determines whether data from a new trace should be classified as driving or non-driving data. The output from each decision tree is counted as a vote for driving or non-driving, and the PU classification model determines the total number of trees or percentage of decision trees that voted for driving, or the number or percentage that voted for non-driving. The PU classification model compares the determined number or percentage to a threshold to determine whether to classify the data as driving or non-driving. For example, the threshold may be at least 50% votes for driving to classify the data as driving data, at least 60% votes for driving, or some other selected threshold. In other embodiments, machine learning can be used to learn an appropriate threshold for the trained random forest using the PU training data.

Figure 7:
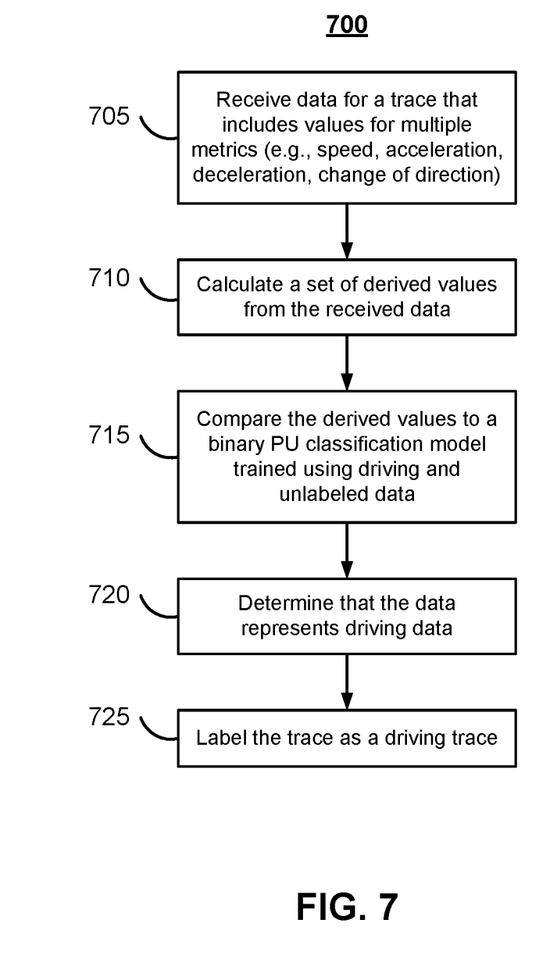
FIG. 7 shows a process for classifying a trace as a driving trace using a PU classifier, in an embodiment.

FIG. 7 shows a process 700 for classifying a trace as a driving trace using a PU classifier, in an embodiment. The PU classifier can be trained as described above with respect to FIG. 6.

At 705, the server computer 105 executing the mapping application 110 with the activity detection instructions 115 receives data for a trace that includes values for multiple metrics, such as speed, acceleration, deceleration, and change of direction. The trace data further includes any other data used to calculate the derived values described with respect to FIG. 6; for example, the trace data may include location data for calculating a distance ratio is calculated, and time data in the trace may indicate a time and day at which the trace was obtained.

At 710, the server computer 105 executing the mapping application 110 with the activity detection instructions 115 calculates a set of derived values from the received values. In some embodiments, if the binary PU classification model trained at 615 bases its classification decision on a subset of the values calculated in 610, the server computer 105 calculates this subset of derived values that will be used by the trained classification model (e.g., a subset of derived values that were determined to be relevant or important in classifying a trace as a driving or non-driving trace). In some embodiments, the server computer 105 may calculate derived values that are not used by the binary classification model, e.g., if the server computer 105 is also performing process 400 (described with respect to FIG. 4) on the trace.

At 715, the server computer 105 executing the mapping application 110 with the activity detection instructions 115 compares the derived values to a binary PU classification model that was trained using driving and unlabeled data. The binary PU classification model may include a set of rules, and the derived values are compared to the set of rules in the classification model to assess whether the derived values are similar to driving traces used in training the model, or to determine a likelihood that the derived values are representative of derived values that were derived from a driving trace. The binary PU classification model may have been trained according to process 600 described above.

At 720, the server computer 105 executing the mapping application 110 with the activity detection instructions 115 determines that the data represents driving data based on the output of the comparison at 715. The binary PU classification model may directly output the determination of whether or not the data represents driving data, or the binary PU classification model may output a likelihood that the data represents driving data, and this likelihood is compared to a threshold.

At 725, the server computer 105 executing the mapping application 110 with the activity detection instructions 115 labels the trace as a driving trace if the server computer 105 has determined that the data represents driving data. If the server computer has not determined that the data represents driving data, it may label the trace as a non-driving trace, or it may leave the trace unlabeled. In some embodiments, the PU classifier is trained to only classify traces as driving traces if there is a high likelihood that the trace is a driving trace; this may lead the PU classifier to not label traces that were in fact driving traces so that these traces are not incorrectly labeled as non-driving traces. In such cases, the PU classifier may be used in situations where only driving data is relevant, and false positives are problematic. For example, a PU classifier that misses some driving traces but includes very few false positives can be used to build a database of traces used to identify roadways. False positives may not be tolerated because they may identify paths that cars cannot or should not navigate (e.g., bike paths), and a lower amount of data may be sufficient because the database can be generated over a relatively long period of time. On the other hand, a PU classifier that misses fewer driving traces but includes more false positives may be used to build a database of traces used to detect anomalies in traffic patterns. In this case, false positives may be less problematic, and a greater amount of data is desirable, because the database is generated and re-generated in near-real time.

While process 700 has been described as being performed by the server 105, in other embodiments, one or more steps of process 700 may be performed by the mobile computing device 145, a combination of the server 105 and the mobile computing device 145, or any other device or combination of devices. For example, if the mobile computing device 145 receives the binary PU classification model from the server 105, the mobile computing device 145 may collect trace data, calculate the set of derived values, compare the derived values to the received binary PU classification model, determine that the data in the trace represents driving data, and label the trace as a driving trace.

The use of a classification model—whether a model based on a random forest, a PU classification model, a neural network, as discussed above—to label trace data as representing a given model of travel has various applications. A classification model that indicates whether trace data represents driving data enables selecting such data to perform additional analysis. For example, driving data can be segregated from non-driving data and used to update driving traffic statistics, plan driving routes, and the like. As another example, the segregation of driving from non-driving data can be used to perform analysis of how transportation patterns differ between different types of transportation. The ability to classify particular trace data as representing stationary positions rather than movement also allows better anonymization of user data by facilitating removing data about locations where users remain stationary. Such locations are more likely to geographically coincide with homes, schools, or other places of interest that could be used to tie an otherwise anonymous user to personally-identifying public information, such as public property records of homes. Additionally, being able to identify stationary data facilitates removing the beginning and ending locations of trace data (where there is typically significant stationary data) from a trace consisting of interspersed moving and stationary data; such stationary data can be removed from beginning and ends of the trace data until the classifier determines that the trace data now represents driving data.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method for classifying activities of mobile computing devices based upon data representing movement of the devices, the method comprising:
    receiving digital data corresponding to a trace by a device, the digital data comprising location data and time data obtained over a period of time and representing movement of the device;
    obtaining, from the digital data, a plurality of values corresponding to a plurality of metrics;
    calculating a set of derived values for the plurality of metrics from the obtained plurality of values corresponding to the plurality of metrics;
    comparing the set of derived values to a neural network classification model trained using a first set of traces representing a first type of movement to determine whether the received digital data represents movement of the first type; and
    in response to determining that the digital data represents movement of the first type, labeling the received digital data corresponding to the trace with the first type of movement.

2. The method of claim 1, wherein the first type of movement is driving.

3. The method of claim 1, wherein the neural network classification model indicates whether the movement is of the first type, whether the movement if of a type other than the first type, and whether the movement represents data noise.

4. The method of claim 1, wherein the neural network classification model was additionally trained using a second set of traces representing movement known not to be of the first type, and a third set of traces representing data noise.

5. The method of claim 4, further comprising training the neural network classification model by:
    calculating, for each of the first set of traces and the second set of traces, a plurality of derived values; and
    training, using machine learning, the neural network classification model based on the derived values.

6. The method of claim 1, wherein the derived values are computed from sets of N consecutive readings from the location data including K reading overlaps with other sets.

7. The method of claim 1, further comprising, in response to determining that the digital data represents movement of the first type, updating driving traffic statistics using the digital data.

8. A non-transitory computer-readable storage medium storing instructions that when executed by a computer processor perform actions comprising:
    receiving digital data corresponding to a trace by a device, the digital data comprising location data and time data obtained over a period of time and representing movement of the device;
    obtaining, from the digital data, a plurality of values corresponding to a plurality of metrics;
    calculating a set of derived values for the plurality of metrics from the obtained plurality of values corresponding to the plurality of metrics;
    comparing the set of derived values to a neural network classification model trained using a first set of traces representing a first type of movement to determine whether the received digital data represents movement of the first type; and
    in response to determining that the digital data represents movement of the first type, labeling the received digital data corresponding to the trace with the first type of movement.

9. The non-transitory computer-readable storage medium of claim 8, wherein the first type of movement is driving.

10. The non-transitory computer-readable storage medium of claim 8, wherein the neural network classification model indicates whether the movement is of the first type, whether the movement if of a type other than the first type, and whether the movement represents data noise.

11. The non-transitory computer-readable storage medium of claim 8, wherein the neural network classification model was additionally trained using a second set of traces representing movement known not to be of the first type, and a third set of traces representing data noise.

12. The non-transitory computer-readable storage medium of claim 11, the actions further comprising training the neural network classification model by:
    calculating, for each of the first set of traces and the second set of traces, a plurality of derived values; and
    training, using machine learning, the neural network classification model based on the derived values.

13. The non-transitory computer-readable storage medium of claim 8, wherein the derived values are computed from sets of N consecutive readings from the location data including K reading overlaps with other sets.

14. The non-transitory computer-readable storage medium of claim 8, the actions further comprising, in response to determining that the digital data represents movement of the first type, updating driving traffic statistics using the digital data.

15. A computer system comprising:
    a computer processor; and
    a non-transitory computer-readable storage medium storing instructions that when executed by a computer processor perform actions comprising:
        receiving digital data corresponding to a trace by a device, the digital data comprising location data and time data obtained over a period of time and representing movement of the device;
        obtaining, from the digital data, a plurality of values corresponding to a plurality of metrics;

calculating a set of derived values for the plurality of metrics from the obtained plurality of values corresponding to the plurality of metrics;

comparing the set of derived values to a neural network classification model trained using a first set of traces representing a first type of movement to determine whether the received digital data represents movement of the first type; and in response to determining that the digital data represents movement of the first type, labeling the received digital data corresponding to the trace with the first type of movement.

16. The computer system of claim 15, wherein the first type of movement is driving.

17. The computer system of claim 15, wherein the neural network classification model indicates whether the movement is of the first type, whether the movement if of a type other than the first type, and whether the movement represents data noise.

18. The computer system of claim 15, wherein the neural network classification model was additionally trained using a second set of traces representing movement known not to be of the first type, and a third set of traces representing data noise.

19. The computer system of claim 18, the actions further comprising training the neural network classification model by:

calculating, for each of the first set of traces and the second set of traces, a plurality of derived values; and training, using machine learning, the neural network classification model based on the derived values.

20. The computer system of claim 15, wherein the derived values are computed from sets of N consecutive readings from the location data including K reading overlaps with other sets.

* * * * *